(12) United States Patent
Levonas et al.

(10) Patent No.: US 7,068,780 B1
(45) Date of Patent: Jun. 27, 2006

(54) HYBRID ECHO CANCELLER

(75) Inventors: Robin Levonas, Red Bank, NJ (US); Hai Liu, Kearny, NJ (US)

(73) Assignee: Conexant, Inc., Red Bank, NJ (US)

( * ) Notice: Subject to any disclaimer, the term of this patent is extended or adjusted under 35 U.S.C. 154(b) by 654 days.

(21) Appl. No.: 09/939,439

(22) Filed: Aug. 24, 2001

Related U.S. Application Data (60) Provisional application No. 60/229,115, filed on Aug. 30, 2000.

(51) Int. Cl.
*H04M 9/08* (2006.01)

(52) U.S. Cl. .............................. 379/406.08; 379/406.1; 379/406.5; 379/406.14; 370/286; 370/268; 370/269

(58) Field of Classification Search ............................... 379/406.01–406.16, 410, 411; 375/350, 375/290, 291; 370/268, 269, 286
See application file for complete search history.

(56) References Cited

U.S. PATENT DOCUMENTS

| | | | | |
|---|---|---|---|---|
| 5,084,865 A | * | 1/1992 | Koike ......................... | 370/289 |
| 5,388,092 A | * | 2/1995 | Koyama et al. ............. | 370/289 |
| 5,467,394 A | * | 11/1995 | Walker et al. .............. | 379/392 |
| 5,561,424 A | * | 10/1996 | Norsworthy et al. ........ | 341/126 |
| 5,577,027 A | * | 11/1996 | Cheng ........................ | 370/286 |
| 5,638,311 A | * | 6/1997 | Fujii et al. ................... | 708/322 |
| 5,659,581 A | * | 8/1997 | Betts et al. .................. | 375/296 |
| 5,870,431 A | * | 2/1999 | Easton et al. ............... | 375/230 |
| 5,887,059 A | | 3/1999 | Xie et al. ..................... | 379/410 |
| 5,909,463 A | * | 6/1999 | Johnson et al. ............. | 375/220 |
| 5,933,797 A | * | 8/1999 | H.ang.akansson et al. .. | 702/191 |
| 5,953,410 A | * | 9/1999 | Pfeil et al. .............. | 379/406.05 |
| 6,157,680 A | * | 12/2000 | Betts et al. .................. | 375/285 |
| 6,163,609 A | * | 12/2000 | Makinen et al. ....... | 379/406.08 |
| 6,185,300 B1 | * | 2/2001 | Romesburg ............ | 379/406.09 |
| 6,240,180 B1 | | 5/2001 | Younce et al. .............. | 379/410 |
| 6,256,383 B1 | * | 7/2001 | Chen ..................... | 379/406.08 |
| 6,282,286 B1 | * | 8/2001 | Reesor et al. .......... | 379/406.05 |
| 6,408,021 B1 | * | 6/2002 | Mehrabanzad et al. ..... | 375/222 |

(Continued)

Primary Examiner—Matthew D. Anderson
Assistant Examiner—Tuan Pham
(74) Attorney, Agent, or Firm—Thomas, Kayden, Horstemeyer & Risley (57) ABSTRACT

Systems and methods for reducing transmit echo in a transceiver are disclosed. A hybrid echo canceller includes a limited tap length FIR filter to cancel short-term echo, while an interpolated filter is used to cancel the long-tail echo. The limited tap length FIR filter adapts and calculates coefficients for each adapted tap. Taps of the interpolated filter, on the other hand, are adapted but coefficients are calculated for a subset of the taps. Various interpolation schemes may be applied to the calculated coefficients to associate a coefficient with each tap of the interpolated filter. The technique presented produces an effective filter length of N taps with a reduction in computation and signal processing resources. Preferred embodiments of the echo canceller may be construed as methods for reducing transmit echo. A preferred method includes the steps of: bifurcating a finite impulse response filter in response to the conversion rate of the filter tap coefficients; adaptively calculating and applying a filter tap coefficient to each tap of a short term portion of the bifurcated filter; adaptively calculating a subset of the filter tap coefficients of a long tail portion of the bifurcated filter; and applying a interpolation technique to the remaining set of filter tap coefficients of the long tail portion of the bifurcated filter.

12 Claims, 6 Drawing Sheets

U.S. PATENT DOCUMENTS

| | | |
|---|---|---|
| 6,426,979 B1 * | 7/2002 | Yang et al. .................. 375/285 |
| 6,442,272 B1 * | 8/2002 | Osovets ................. 379/406.01 |
| 6,477,200 B1 * | 11/2002 | Agazzi et al. .............. 375/233 |
| 6,526,093 B1 * | 2/2003 | Bao et al. .................... 375/233 |
| 6,597,746 B1 * | 7/2003 | Amrany et al. ............. 375/296 |
| 6,687,235 B1 * | 2/2004 | Chu ........................... 370/286 |
| 6,690,791 B1 * | 2/2004 | Kratschmann et al. . 379/406.14 |
| 6,721,287 B1 * | 4/2004 | Lai et al. ..................... 370/286 |
| 6,826,279 B1 * | 11/2004 | Alavi et al. ............ 379/406.08 |
| 2005/0084002 A1 * | 4/2005 | Agazzi et al. .............. 375/220 |

* cited by examiner

HYBRID ECHO CANCELLER

CROSS-REFERENCE TO RELATED APPLICATIONS

The present application claims the benefit of co-pending U.S. Provisional Patent Application, issued Ser. No. 60/229,115, and filed Aug. 30, 2000, which is hereby incorporated by reference in its entirety.

TECHNICAL FIELD

The present invention relates generally to data communications, and more particularly, to a system and method for achieving echo reduction in a symmetric digital subscriber line (DSL) communication system.

BACKGROUND

Line echoes (i.e., electrical echoes) occur in telecommunications networks due to impedance mismatches at hybrid transformers that couple two-wire local customer loops to four-wire long-distance trunks. Ideally, the hybrid passes the far-end signal at the four-wire receive port through to the two-wire transmit port without allowing leakage into the four-wire transmit port. However, this would require exact knowledge of the impedance seen at the two-wire ports, which in practice varies widely from individual circuit to individual circuit and can only be estimated. Consequently, the leaking signal returns to the far-end transmitter as an echo. The situation can be further complicated by the presence of two-wire toll switches, allowing intermediate four-two-four wire conversions internal to the network. In telephone connections using satellite links, with round-trip delays on the order of 600 ms, line echoes can become particularly disruptive.

Echo suppressors have been developed to control line echoes in telecommunications networks. Echo suppressors de-couple the four-wire transmit port when signal detectors determine that there is a far-end signal at the four-wire receive port without any near-end signal at the two-wire receive port. Echo suppressors, however, are generally ineffective during double-talk when speakers or modems at both ends of the system are talking or transmitting simultaneously. During double-talk, the four-wire transmit port carries both the near-end signal and the far-end echo signal. Furthermore, echo suppressors tend to produce speech clipping, especially during long delays caused by satellite links.

Echo cancellers have been developed to overcome the shortcomings of echo suppressors. Echo cancellers were first deployed in the U.S. telephone network in 1979, currently are virtually ubiquitous in long-distance telephone circuits. See generally, Messerschmitt, "Echo Cancellation in Speech and Data Transmission", IEEE Journal on Selected Areas in Communications, Vol. SAC-2, No. 2, March 1984, pp. 283–298; and Tao et al., "A Cascadable VLSI Echo Canceller", IEEE Journal on Selected Areas in Communications, Vol. SAC-2, No. 2, March 1984, pp. 298–303.

Echo cancellers generally include an adaptive filter and a subtracter. The adaptive filter attempts to model the echo path. The incoming signal is applied to the adaptive filter, which generates a replica signal. The replica signal and the echo signal are then applied to the subtracter. The subtracter removes the replica signal from the echo signal to produce an error signal. The error signal is fed back to the adaptive filter, which adjusts its filter coefficients (or taps) in order to minimize the error signal. In this manner, the filter coefficients converge toward values that optimize the replica signal in order to cancel (i.e., at least partially offset) the echo signal. Echo cancellers offer the advantage of not disrupting the signal path. Economic considerations place limits on the fineness of sampling times and quantization levels in digital adaptive filters, but technological improvements are relaxing these limits.

In the field of data communications a transceiver, or modem, is used to convey information from one location to another. Digital subscriber line (DSL) technology now enables DSL transceivers to more rapidly communicate data than previously possible with purely analog modems. DSL transceivers communicate by modulating a baseband signal carrying encoded digital data, converting the modulated digital data signal to an analog signal, and transmitting the analog signal over a conventional copper wire pair using techniques that are known in the art. These known techniques include mapping the information to be transmitted into a multi-dimensional multi-level signal space constellation and slicing the received constellation to recover the transmitted information. The constellation can include both analog and digital information or only digital information.

Since DSL transceivers use the public switched telephone network (PSTN) and other similar networks to communication over twisted-wire pairs, DSL systems are subject to the same echo cancellation problems described above with respect to voice band users of the PSTN. Echo is very harmful to successful DSL signal delivery as it significantly degrades signal quality. Therefore, an echo cancellation technique should be employed to separate the upstream and downstream signals in DSL transceivers.

Various signal-processing techniques may be used to cancel the echo. Often, the echo signal has a large low-frequency content that results in an echo response in the time-domain with a very long tail. Under these conditions, an echo canceller with many taps is required to effectively cancel the echo. An echo canceller with many taps requires a large amount of signal processing resources and results in a significant computation cost. One technique that reduces low frequency content of the echo signal is to insert a high pass filter in the receive path. This technique, however, removes useful receive signal energy (i.e., data) resulting in reduced receiver performance.

As previously described, echo occurs primarily because of mismatched impedances at the hybrid connectors. Because the impedances of the transmission lines are time variant as well as line-dependent, the echo canceller must be adaptive. Stated another way, the echo canceller must learn the echo characteristics and track time-varying changes in the underlying communication system.

The echo canceller can be made adaptive as follows: After estimating the echo parameters, emulating the echo, and subtracting it from the received signal, the remaining signal (which contains some residual echo) may be fed back and used to update the estimated set of echo parameters. This feedback loop allows the echo canceller to converge to a close approximation of the echo parameters.

Echo cancellation may be accomplished either in the time-domain or in the frequency-domain. In time-domain echo cancellation, echo parameters are derived through use of, for example, a gradient search algorithm, which adjusts the echo parameters in order to minimize some performance criteria (for example, mean square error). In frequency-domain echo cancellation, the echo parameters are obtained by sampling the spectrum of the echo channel rather than sampling the echo channel response. Echo emulation and adaptive updates can then take place in the frequency-domain, using the estimate of the spectrum of the echo channel.

Most existing echo cancellers use the tapped-delay line structure (also known as a finite impulse response (FIR) filter) to model and replicate the echo. However, at high data rates, FIR filters can be several hundred taps long, and the computational complexity can become extremely high. As a result, digital filters generally perform a large number of computations (e.g., multiplication) and require a large number of storage elements (e.g., registers) for temporarily storing computed variables (e.g., state variables) in carrying out the computations. The number of storage elements and computations carried out by a digital filter directly effects the device's size, speed, and power consumption. As the complexity of digital filter increases, the number of computations and the number of registers required tend to increase. Particularly, in systems utilizing baseband modulation schemes, including Pulse Amplitude Modulation (PAM), where there is a large low frequency signal content and, consequently, a long echo tail. For these reasons, it is desirable to improve the computational efficiency and speed (e.g., reduce the number of computations) and reduce the number of storage elements required in FIR filters. Accordingly, an alternative solution that overcomes the shortcomings of the prior art is desired.

SUMMARY OF THE INVENTION

In light of the foregoing, a hybrid echo canceller is introduced that processes short-term components and long-tail components of the echo response separately. A limited tap length FIR filter is used to cancel the short-term echo components, while an interpolated filter is used to cancel the long-tail echo. The limited tap length FIR filter adapts and calculates coefficients for each adapted tap. Taps of the interpolated filter, on the other hand, are adapted but coefficients are calculated for a subset of the taps. Various interpolation schemes may then be applied to the calculated coefficients to associate a coefficient with each tap of the interpolated filter. The technique presented produces an effective filter length of X taps with a reduction in computation and signal processing resources.

In a preferred embodiment, a hybrid echo canceller may be configured with a FIR filter and an interpolated tap filter. The interpolated tap filter may adapt or calculate an appropriate coefficient to apply at each $K^{th}$ tap. Taps between each $K^{th}$ tap may simply apply the last calculated coefficient to each "skipped" tap to approximate the long tail echo response.

The hybrid echo canceller may be realized in providing methods for reducing transmit echo in a DSL transceiver. A preferred method includes the steps of: (1) bifurcating a finite impulse response filter in response to the conversion rate of the filter tap coefficients; (2) adaptively calculating and applying a filter tap coefficient to each tap of a short term portion of the bifurcated filter; (3) adaptively calculating a subset of the filter tap coefficients of a long tail portion of the bifurcated filter; and (4) applying a interpolation technique to the remaining set of filter tap coefficients of the long tail portion of the bifurcated filter.

Variations of the systems, methods, and features herein presented will be or become apparent to one with skill in the art upon examination of the following drawings and detailed description. All variations are included within the scope of the image acquisition and enhancement system as protected by the accompanying claims.

BRIEF DESCRIPTION OF THE DRAWINGS

The accompanying drawings incorporated in and forming a part of the specification illustrate several aspects of the hybrid echo canceller, and together with the description serve to explain the principles thereof. The components in the drawings are not necessarily to scale, emphasis instead placed upon clearly illustrating the principles of the hybrid echo canceller. Moreover, in the drawings, like reference numerals designate corresponding parts throughout the several views. In the drawings.

DETAILED DESCRIPTION

Having summarized the invention above, reference is now made in detail to the description of the hybrid echo canceller as illustrated in the drawings. While the hybrid echo canceller will be described in connection with these drawings, there is no intent to limit it to the embodiment or embodiments disclosed therein. On the contrary, the intent is to cover all alternatives, modifications and equivalents included within the spirit and scope defined by the appended claims.

The hybrid echo canceller can be implemented in software, hardware, firmware, or a combination thereof. In the preferred embodiment, the elements of the hybrid echo canceller are implemented in hardware within the various circuit components of an application specific integrated circuit (ASIC) such as a suitably configured digital signal processor (DSP). In an alternative embodiment, a hybrid echo canceller may be implemented in software that is stored in a memory and that configures and drives a suitable DSP. Moreover, the foregoing software can be stored on any computer-readable medium for transport or for use by or in connection with any suitable computer-related system or method. In the context of this document, a computer-readable medium is an electronic, magnetic, optical, or other physical device or means that can contain or store a computer program for use by or in connection with a computer-related system or method.

While the foregoing preferred embodiment illustrates the hybrid echo canceller in the context of a high-bit-rate DSL (HDSL) remote transceiver, the hybrid echo canceller is applicable to symmetric DSL transceivers and like devices configured to support HDSL2, SDSL, and G.SHDSL communication protocols. For that matter, the hybrid echo canceller may be applied in systems where a transmitted echo is undesired in a receive channel. Those skilled in the art will appreciate that the system and method for reducing transmit echo is applicable and preferable in both the central office and remote transceiver equipment.

Definitions

The following terms as used throughout the present description of a hybrid echo canceller shall have the following meanings.

Impulse Response—The "impulse response" of a FIR filter is actually just the set of FIR coefficients. (If you put an "impulse" into a FIR filter which consists of a "1" sample followed by many "0" samples, the output of the filter will be the set of coefficients, as the 1 sample moves past each coefficient in turn to form the output.)

Tap—A FIR "tap" is simply a coefficient/delay pair. The number of FIR taps, (often designated as "N") is an indication of 1) the amount of memory required to implement the filter, 2) the number of calculations required, and 3) the amount of "filtering" the filter can do; in effect, more taps means more stopband attenuation, less ripple, narrower filters, etc.)

Multiply-Accumulate (MAC)—In a FIR context, a "MAC" is the operation of multiplying a coefficient by the corresponding delayed data sample and accumulating the result. FIR filters usually require one MAC per tap. Most DSP microprocessors implement the MAC operation in a single instruction cycle.

Transition Band—The band of frequencies between passband and stopband edges. The narrower the transition band, the more taps are required to implement the filter. (A "small" transition band results in a "sharp" filter.)

Delay Line—The set of memory elements that implement the "$Z^{-1}$" delay elements of the FIR calculation.

Circular Buffer—A special buffer which is "circular" because incrementing at the end causes it to wrap around to the beginning, or because decrementing from the beginning causes it to wrap around to the end. Circular buffers are often provided by DSP microprocessors to implement the "movement" of the samples through the FIR delay-line without having to literally move the data in memory. When a new sample is added to the buffer, it automatically replaces the oldest one.

Interpolation—The act of estimating values between known values of a function.

Figure 1:
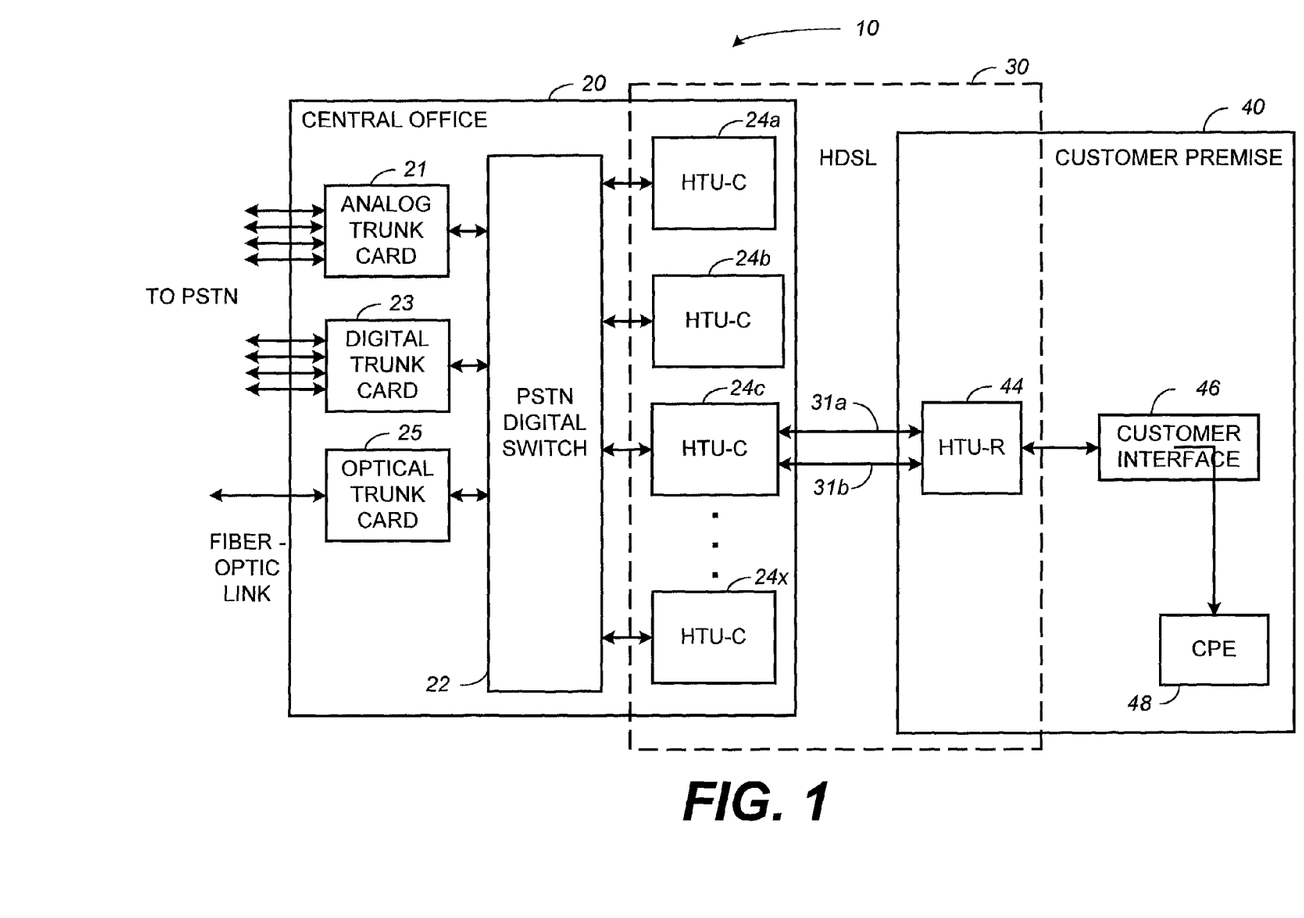
FIG. 1 is a schematic diagram illustrating a symmetric high-bit rate DSL (HDSL) communication system.

The HDSL link illustrated in FIG. 1 is offered by way of example to highlight various interface equipment that may be used to provide a T1 capacity link between a PSTN central office (CO) and a customer premise (CP). In this regard, FIG. 1 illustrates a basic HDSL network link architecture.

As illustrated in FIG. 1, a HDSL network link 10 may comprise equipment located within a CO 20, equipment located within a CP 40, and HDSL interface equipment 30 as required within each location to transfer data to and from the remainder of the PSTN (not shown). More specifically, the CO 20 may include a plurality of trunk line interfaces, herein labeled analog trunk card 21, digital trunk card 23, and optical trunk card 25, respectively; a PSTN digital switch 22; and a plurality of HDSL transmission units— central office (HTU-C) 24a, 24b, 24c, . . . , and 24x. As illustrated in FIG. 1, each HTU-C 24a, 24b, 24c, . . . , and 24x may be coupled via two twisted-pair telephone transmission lines 31a, 31b to a dedicated HDSL transmission unit—remote (HTU-R) 44 (one shown for simplicity of illustration). As also illustrated in FIG. 1, the combination of the HTU-C 24c, the two twisted-pair telephone transmission lines 31a, 31b, and the HTU-R 44 may comprise the HDSL interface equipment 30. As further illustrated in FIG. 1, the CP 40 may comprise a customer interface 46 and customer premise equipment 48 which may contain one or more computing devices (not shown).

It is significant to note that downstream and upstream data transmissions that are transmitted across the HDSL network link 10 of FIG. 1 must be processed at the HTU-Rs 44 and the HTU-Cs 24 in order to ensure that data transmissions are inverse multiplexed and reconstructed into their original configuration. Each of the HTU-Rs 44 and the HTU-Cs 24 may further comprise a transceiver and a mapper (both not shown). At one end of the HDSL communications network 10, a first mapper may be used to inverse multiplex or distribute a data transmission across multiple transmit media (i.e., the twisted-pair telephone transmission lines 31a, 31b). At the opposite or receiving end of the HDSL communications network 10, a second mapper may be used to multiplex or reconstruct the original data transmission.

For example, a downstream data transmission or a data transmission from a CO 20 to a CP 40 may be inverse multiplexed such that a portion of the data is transmitted via the HTU-C 24c across a first twisted pair telephone transmission line 31a with the remaining portion of the data transmission sent via a second twisted pair telephone transmission line 31b. After the first and second portions of the data transmission are received and reconstructed by the HTU-R 44, the first and second portions of the original data stream may be multiplexed before being forwarded to the customer interface 46 and the CPE 48. Often the customer interface 46 is implemented with a router (not shown) having a port coupled with one or more HTU-Rs 44 and or other network interface devices.

Figure 2:
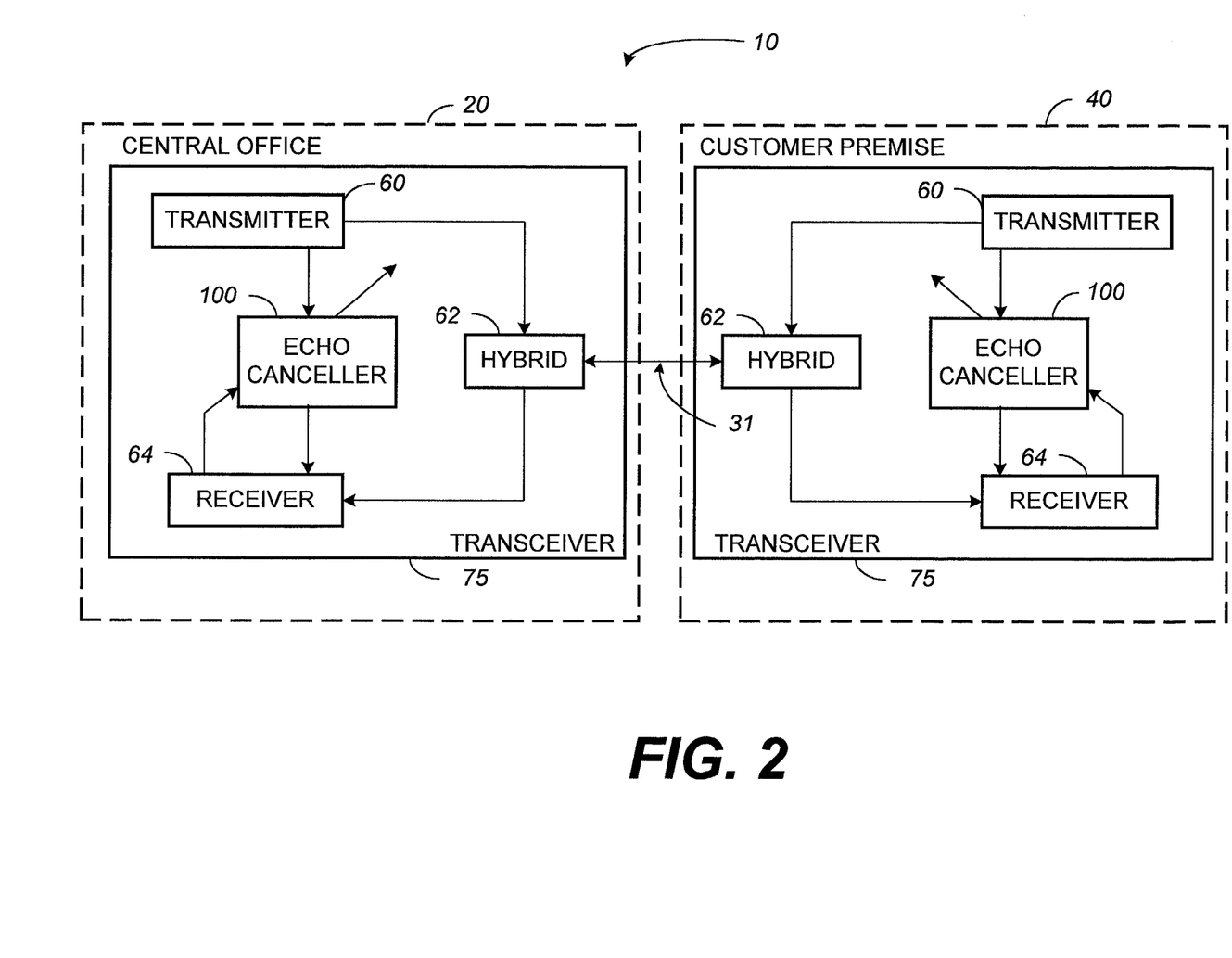
FIG. 2 is a schematic diagram illustrating the location of a hybrid and of an echo canceller in transceivers of the HDSL communication system of FIG. 1.

As illustrated in FIG. 2, a HDSL network link 10 may include a first transceiver 75 located within a CO 20 and a similarly configured transceiver 75 located within a CP 40. More specifically, the CO 20 may include a transmitter 60, a hybrid 62, a receiver 64 and an echo canceller 100. Transmitter 60 may be configured to supply a digitally encoded data stream consisting of a series of data symbols over time. As illustrated in the functional block diagram of FIG. 2, the transmitter output may be supplied to the hybrid 62, which couples the designated transmission signal on the twisted-pair telephone transmission line 31. Concurrently, the hybrid 62 may receive a remote data transmission from the CP 40 via the same twisted-pair telephone transmission line 31. The hybrid 62 provides limited echo attenuation before supplying the CO receiver 64 with the remote data transmission.

The hybrid 62 can only provide limited echo cancellation or attenuation due to the uncertain twisted pair loop impedance across the frequency band in use. As a result, local transmission echo (i.e., that portion of the transmit signal from CO transmitter 60 that arrives at the receiver 64 via hybrid 62) should be digitally reduced or filtered in order to maximize transceiver 75 performance. As illustrated in the functional block diagram of FIG. 2, echo canceller 100 is inserted in parallel with the echo path. The echo canceller 100 synthesizes the echo path signal (described hereinafter with regard to FIG. 3) to produce an echo replica with the same data that is applied to the transmitter 60, but with a reversed sign to cancel the real echo at receiver 64. As further illustrated in FIG. 2, a similarly configured transceiver 75 may be found within CP 40.

An echo path transfer function for a twisted-pair telephone transmission line 31 varies with frequency. At low frequency, the echo path transfer function has a relatively low echo return loss due to the higher impedance of the twisted-pair telephone transmission line 31. The echo path return loss increases with increasing frequency until a return loss maximum is reached typically between 100 kHz and 300 kHz. Thereafter, the echo return loss decreases due to leakage inductance of the isolation transformer of the hybrid 62 (not shown). Those skilled in the art will appreciate that the echo path transfer function may be modified by transmit and receive path filters (not shown).

An echo path impulse response, on the other hand, typically consists of a rapidly changing short term or initial portion and a slowly decaying tail portion. Generally, the rapidly changing initial portion is due to reflections generated at circuit terminals with impedance mismatches and at bridged tap locations on the twisted-pair telephone transmission line 31. The tail portion, on the other hand, is mainly related to the primary inductance of the isolation transformer of the hybrid 62 (not shown). In nearly all configurations the reflections die out in a relatively short period of time compared with the duration of the echo tail. Assuming the reflections become negligible beyond the first round trip across the twisted-pair telephone transmission line 31, reflections should not last more than the round trip delay of the longest twisted-pair loop. For example, for an 18 kft twisted pair loop, the round trip delay is about 40 μsec.

Figure 3:
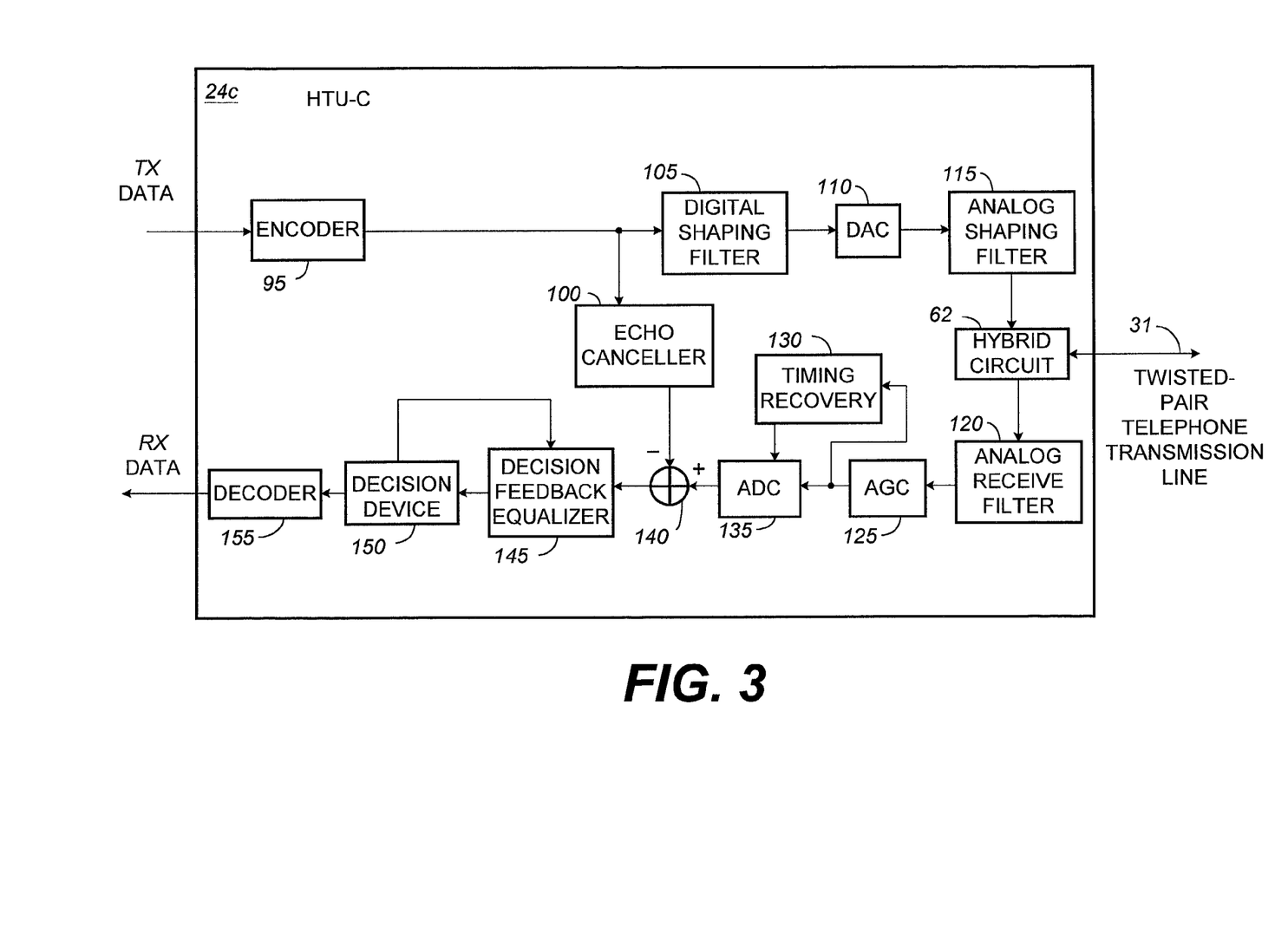
FIG. 3 is a functional block diagram further illustrating the high-bit rate transmission unit of the communication system of FIG. 1.

Reference is now directed to FIG. 3, which presents a functional block diagram further illustrating the high-bit rate transmission unit of the communication system of FIG. 1. As shown in FIG. 3, a HDSL transmission unit—central office (HTU-C) 24c may be configured to receive a locally generated transmit signal (i.e., TX data) that the HTU-C 24c encodes, filters, and processes before coupling the transmit signal to the twisted-pair telephone transmission line 31 via hybrid 62. Similarly, the HTU-C 24c is configured to receive a remotely generated transmit signal (i.e., RX data) that the HTU-C 24c recovers, filters, and decodes before forwarding the receive signal to other devices in the CO 20 (not shown).

As further illustrated in FIG. 3, the HTU-C 24c may comprise an encoder 95, a digital shaping filter 105, a digital to analog converter (DAC) 110, an analog shaping filter 115, and a hybrid circuit 62 in the upstream data path. Conversely, a HTU-C 24c may comprise a hybrid circuit 62, an analog receive filter 120, an automatic gain control amplifier (AGC) 125, a timing recovery circuit 130, an analog to digital converter (ADC) 135, an echo canceller 100, a decision feedback equalizer 145, a decision device 150, and a decoder 155 in the downstream data path.

In this regard, the upstream data transmission portion of the HTU-C 24c may function as follows. The bits of the digital data input signal may be encoded into a complex data symbol in encoder 95. The complex data symbols encoded over time may be forwarded to the digital shaping filter 105 and the echo canceller 100. Digital shaping filter 105 may take the form of a finite impulse response (FIR) filter selected for shaping the frequency spectrum across a particular HDSL communication channel. The output of the digital shaping filter 105 may then be forwarded to DAC 110.

The HTU-C 24c, having converted the digitally filtered complex data symbols representing the digital input data stream in DAC 110 to an analog signal, the analog representation of the digital data input stream may be further processed by an analog shaping filter 115. In this regard, analog shaping filter 115 may take the form of a Butterworth low-pass filter to control out-of-band energy present in the analog signal. The filtered transmit signal may then be coupled to the twisted pair telephone transmission line 31 via hybrid circuit 62. Hybrid circuit 62 may comprise two unidirectional ports (one for data transmission and one for data reception) and one bi-directional port. The bi-directional port may be integrated with the twisted-pair telephone transmission line 31. If the impedance of the twisted-pair matches the design impedance of the hybrid 62, there will be perfect isolation between the transmitting and receiving ports within hybrid circuit 62. For this ideal case, the hybrid circuit 62 return loss is infinity. In reality, the line impedance varies with frequency as described above and varies significantly between individual twisted-pair telephone transmission lines 31 within the PSTN.

The downstream (i.e., the CO 20 to CP 40) functional operation of HTU-C 24c having been briefly described, reference will now be directed to upstream (i.e., CP 40 to CO 20) data transmissions within HTU-C 24c. In this regard, a Butterworth low-pass filter may be used to implement analog receive filter 120. The function of the analog receive filter 120, like its counterpart in the transmission path of HTU-C 24c, is to reduce out-of-band noise.

The HTU-C 24c, having removed the low-frequency out-of-band noise from the receive or upstream channel with the analog receive filter 120, may forward the filtered analog data stream to the AGC 125. AGC 125 may be necessary to bring the received signal magnitude to that close to the normal transmit signal level for subsequent digital conversion and processing.

The HTU-C 24c, having adjusted the magnitude of the received signal in AGC 125, may then process the filtered and amplified receive signal via timing recovery circuit 130. Timing recovery circuit 130 typically coordinates the sampling clocks used to process data in both DAC 110 in the upstream data path, as well as, ADC 135 in the receive data path. ADC 135 may be synchronized to the DAC 110 through the timing recovery circuit 130 such that upstream and downstream data symbols are synchronized within the HTU-C 24c.

Once the received data has been converted to a digital data stream in ADC 135, within the HTU-C 24c upstream data path, digital signal processing of the complex data symbols encoded within the received signal path may commence. After analog to digital conversion, the output of the echo canceller 100 from the upstream data path may be mathematically combined with the received signal. The combination may take place in summer 140.

Echo canceller 100 may be designed to resemble the equivalence of the echo path as defined by both the digital and analog shaping filters 105, 115, the DAC 110, the hybrid circuit 62, the analog receive filter 120, the AGC 125, the timing recovery circuit 130, and the ADC 135. In typical configurations, the echo path transfer function is identified with an adaptive signal-processing algorithm that is applied to a digital FIR filter.

In general, digital filtering is the processing of a time-domain signal resulting in some change in that signal's original spectral content. The change is usually a reduction of some unwanted input spectral components; that is, filters allow certain frequencies to pass while attenuating other frequencies.

FIR filters use only current and past input samples, and none of the filter's previous output samples, to obtain a current output sample value. Because sudden transitions in the time sequence represent high frequency components, the average sample value behaves like a low-pass filter smoothing sudden changes in the input. Two factors affect a FIR filter's frequency response: (1) the number of taps; and (2) the specific values used for multiplication coefficients.

The HTU-C 24c may then forward the digitized and echo-canceled received signal for filtering by the decision feedback equalizer 145 before being forwarded to the decision device 150. The decision feedback equalizer 145 may comprise a feed-forward filter and a feedback filter. The feed-forward filter equalizes the precursor of the twisted-pair telephone transmission line 31 loop channel impulse response, while the feedback filter, cancels the effect of the post-cursor of the channel impulse response. The decision feedback equalizer is necessary for the HTU-C 24c to maintain minimal noise enhancement during the channel equalization process. Decision device 150 may take the form of a threshold detector configured to correspond to the discrete voltage levels used by the line code. After signal processing in the decision device 150, received symbols are converted back into signal bits in decoder 155 to create a digital data bit stream.

A FIR filter performs time domain convolution by summing the products of shifted input samples of a digital data stream and a sequence of filter coefficients. A FIR filter's output sequence is equal to the convolution of the input data stream and the filter's impulse response. Moreover, a FIR filter's output spectrum is the product of the input spectrum and the filter's frequency response. This result is expected because convolution in the time domain and multiplication in the frequency domain are Fourier transform pairs. The following equation describes the convolution operator or FIR filtering:

$$y[m] = \sum_{n=0}^{N-1} (h[n] * x[m-n]) \quad 0 \le m < N-1. \qquad \text{Eq. 1}$$

Figure 4:
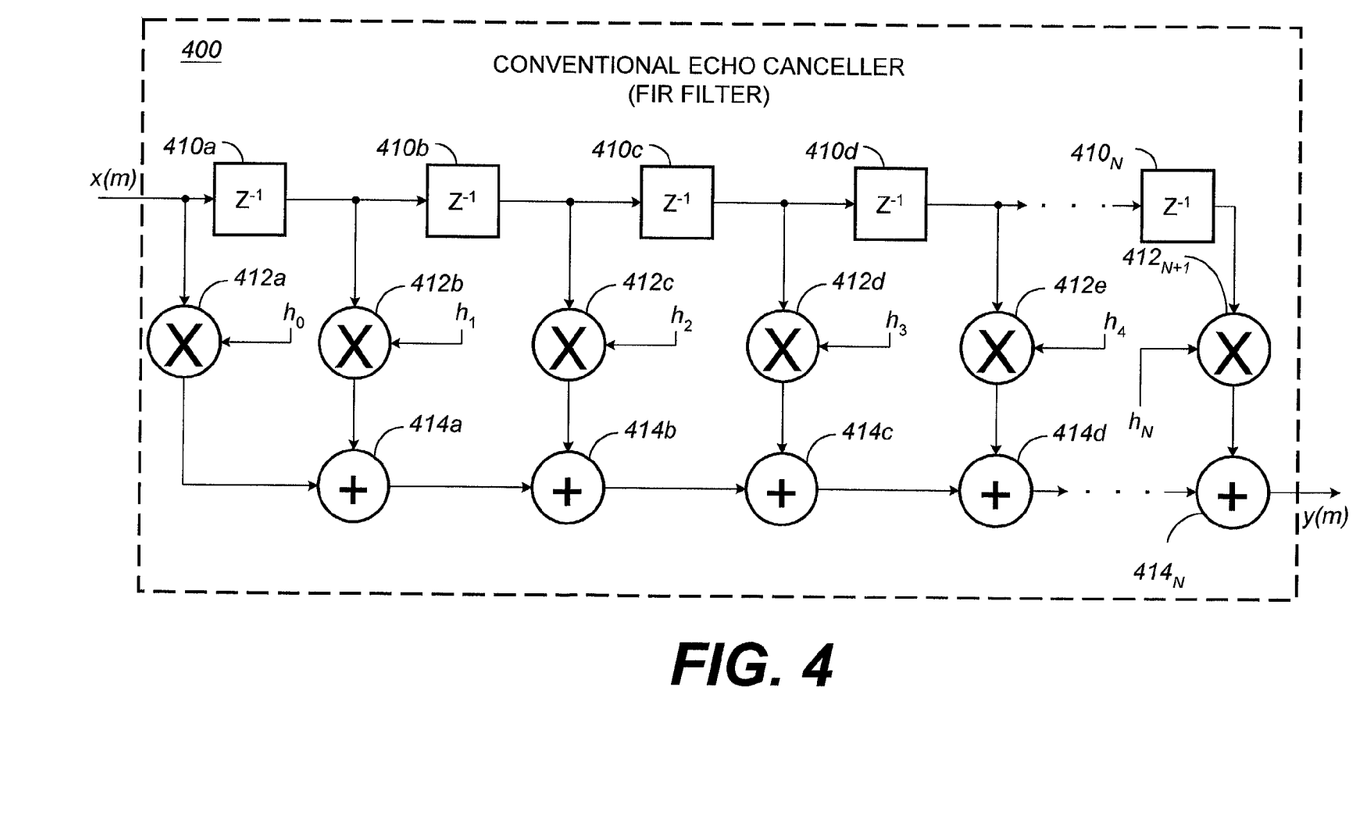
FIG. 4 is a schematic of a conventional echo canceller (FIR filter) that may be used in the high-bit rate transmission unit of FIG. 3.

The convolution process is shown more clearly in the conventional echo canceller (or FIR filter) of FIG. 4. In this regard, a conventional echo canceller 400 in the form of a FIR filter may have an input configured to receive a digital data stream, x(m), and an output, y(m), configured to forward the filtered digital data stream to downstream devices.

As illustrated in FIG. 4, the input may be coupled to a first delay element 410a and a first multiplier 412a. The input after having been processed by the first delay element 410a may be forwarded to a second delay element 410b and a second multiplier 412b. The first multiplier 412a is configured to multiply a first coefficient, $h_0$, to the input data. The first multiplier result is then coupled to an input of a first adder 414a. The second multiplier 412b is configured to multiply a second coefficient, $h_1$, to the output of the first delay element 410a. The second multiplier result is also coupled to an input of the first adder 414a. Moreover, the output from the second delay element 410b is coupled to a third delay element 410c and a third multiplier 412c, which is configured to multiply a third coefficient, $h_2$, to the result from the second delay element 410b.

As further illustrated in FIG. 4 each subsequent delay element 410c, 410d, . . . , 410$_N$ together with its associated multiplier 412d, 412e, . . . , 412$_{N+1}$, which is configured to apply (i.e., multiply) an associated coefficient (e.g., $h_3$, $h_4$, . . . , $h_N$) define a tap of the conventional echo canceller 400. As is also shown in FIG. 4, an output of the first adder 414a is coupled to an input of the second adder 414b and so on throughout the chain of N adders 414 configured to accumulate the results from the N taps of the filter. The output of each of the remaining taps is added to the series of results via each of the associated adders 414c, 414d, . . . , 414$_N$.

The schematic of FIG. 4 clearly show the multiplier/accumulator or MAC operations are used together to produce the output. The conventional echo canceller 400 can be used with many taps, but the input signal sample shifting, the multiplications by the various coefficients, and the summation are the only components of the design.

Hybrid Echo Canceller Architecture and Operation

Figure 5:
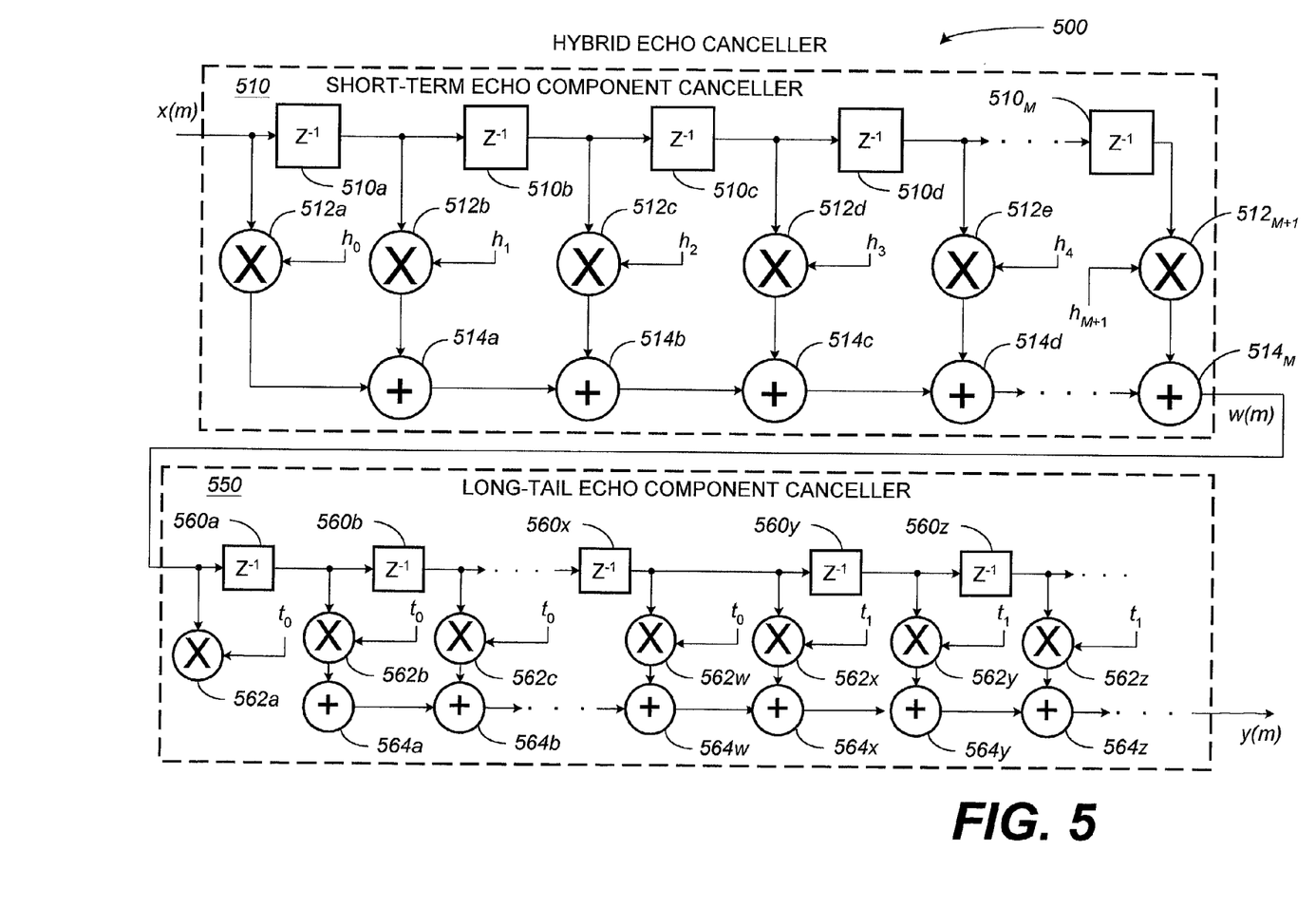
FIG. 5 is a schematic of a hybrid echo canceller that may be used to reduce the computational complexity of the conventional echo canceller in the high-bit rate transmission unit of FIG. 3.

Reference is now directed to FIG. 5, which presents a schematic diagram illustrating a hybrid echo canceller. The echo canceller 500 as illustrated in FIG. 5 includes a short-term echo component canceller 510 and a long-tail echo component canceller 550.

The short-term echo component canceller 510 uses a limited tap length FIR filter to cancel the short-term echo components. The limited tap length FIR filter adapts and calculates a coefficient (e.g., $h_0$, $h_1$, $h_2$, $h_3$, . . . , $h_M$) for each of M adapted taps. In this regard, the individual components of the short-term echo component canceller 510 may mirror those as previously described with regard to the conventional echo canceller 400.

More specifically, the short-term echo component canceller 510 may have an input configured to receive a digital data stream, x(m), and an output, w(m), configured to forward the filtered digital data stream to the long-tail echo component canceller 550.

As illustrated in FIG. 5, the input may be coupled to a first delay element 510a and a first multiplier 512a. The input after having been processed by the first delay element 510a may be forwarded to a second delay element 510b and a second multiplier 512b. The first multiplier 512a is configured to multiply a first coefficient, $h_0$, to the input data. The first multiplier result is then coupled to an input of a first adder 514a. The second multiplier 512b is configured to multiply a second coefficient, $h_1$, to the output of the first delay element 510a. The second multiplier result is also coupled to an input of the first adder 514a. Moreover, the output from the second delay element 510b is coupled to a third delay element 510c and a third multiplier 512c, which is configured to multiply a third coefficient, $h_2$, to the result from the second delay element 510b.

As further illustrated in FIG. 5 each subsequent delay element 510c, 510d, . . ., 510$_M$ together with its associated multiplier 512d, 512e, . . . , 512$_{M+1}$, which is configured to apply (i.e., multiply) an associated coefficient (e.g., $h_3$, $h_4$, . . . , $h_{M+1}$) define a tap of the short-term echo component canceller 500. As is also shown in FIG. 5, an output of the first adder 514a is coupled to an input of the second adder 514b and so on throughout the chain of M adders 514 configured to accumulate the results from the M taps of the short-term echo component canceller 510. The output of each of the remaining taps is added to the series of results via each of the associated adders 514c, 514d, . . . , 514$_M$.

In contrast with the short-term echo component canceller 510, where all taps are adapted (i.e., coefficients are calculated for each of the M taps), an interpolated filter is used to cancel the long-tail echo. An exemplar interpolated filter is represented in the long-tail echo component canceller 550 of FIG. 5. As illustrated (by the application of the same coefficient value over a set of adjacent filter taps), only every $K^{th}$ tap is adapted, while all remaining taps in between adapted taps are updated with an interpolated value. Various interpolation schemes may then be applied to the calculated coefficients to associate a coefficient with each tap of the long-tail echo component canceller 550, but to gain maximum reduction in computational complexity, the tap values between each m*$K^{th}$ (an adapted tap) and (m+1)*$K^{th}$ tap (the next adapted tap), where m is an integer, should be assigned the value of the m*$K^{th}$ tap. This is desirable since the echo tail is typically a slowly decaying response that does not change significantly over the short term, i.e. over a period of several taps. The technique presented produces an effective filter length of X taps where X=M+N with a reduction in computation and signal processing resources.

More specifically, the long-tail echo component canceller 550 may have an input configured to receive a digital data stream, w(m), and an output, y(m), configured to forward the filtered digital data stream to downstream receiver components (not shown).

As illustrated in FIG. 5, the input may be coupled to a first delay element 560a and a first multiplier 562a. The input after having been processed by the first delay element 560a may be forwarded to a second delay element 560b and a second multiplier 562b. The first multiplier 562a is configured to multiply a first coefficient, $t_0$, to the input data. The first multiplier result is then coupled to an input of a first adder 564a. The second multiplier 562b is configured to multiply the first coefficient, $t_0$, to the output of the first delay element 560a. The second multiplier result is also coupled to an input of the first adder 564a. Moreover, the output from the second delay element 560b is coupled to a third delay element 560c and a third multiplier 562c, which is configured to multiply the first coefficient, $t_0$, to the result from the second delay element 560b.

As further illustrated in FIG. 5 each subsequent delay element 560c, 560d, . . . , 560x together with its associated multiplier 562d, 562e, . . . , 562w, which are configured to apply (i.e., multiply) the first coefficient, $t_0$, define a tap of the long-tail echo component canceller 550. As is also shown in FIG. 5, an output of the first adder 564a is coupled to an input of the second adder 564b and so on throughout the chain of adders 564 configured to accumulate the results from the taps of the long-tail echo component canceller 550. The output of each of the remaining taps is added to the series of results via each of the associated adders 564c, 514d, . . . , 514w.

As is also illustrated in the schematic diagram of FIG. 5, the long-tail echo component canceller 550 is configured to apply a subsequently calculated coefficient, ti, to each of the multipliers 562x, 562y, 562z, etc. associated with the next set of taps.

The hybrid echo canceller 500 may be configured with a long-tail echo component canceller 550 configured to adapt or calculate an appropriate coefficient to apply at each $K^{th}$ tap. Taps between each $K^{th}$ tap may simply apply the last calculated coefficient to each "skipped" tap to approximate the long-tail echo response.

In preferred embodiments, the long-tail echo component canceller 550 is configured to adapt or calculate an appropriate coefficient for application over a set of $2^L$ or K taps. Such a long-tail echo component canceller 550 may be deemed a 1×$2^L$ filter.

For example, a particular hybrid echo canceller 500 may be configured with a total of $2^8$ or 256 total taps. Furthermore, the hybrid echo canceller 500 may be configured with a short-term echo component canceller 510 with a length of 96 taps, leaving 256–96 or 160 taps for the long-tail echo component canceller 550. If a 1×4 interpolation scheme is selected, 40 coefficients will be derived. Consequently, the hybrid echo canceller 500 achieves a performance increase over conventional echo cancellers as a direct result of having to derive 120 less coefficients.

The first of the 40 coefficients derived for the long-tail echo component canceller 550 will be applied (i.e., multiplied with the associated delay result) to taps 97, 98, 99, and 100 of the hybrid echo canceller 500. The second of the coefficients will be applied to taps 101 through 104. Similarly, the third coefficient will be applied to taps 105 through 108. It will be appreciated that the interpolation scheme may be applied to the remaining 152 taps of the long-tail echo component canceller 550.

Further performance increases can be realized at the expense of some long-tail echo cancellation accuracy by selecting a 1×8 interpolation scheme. A 1×8 interpolation scheme requires the derivation of only 20 coefficients for the entire 160 tap long-tail echo component canceller 550. Under these circumstances, the first of the 20 coefficients derived for the long-tail echo component canceller 550 will be applied (i.e., multiplied with the associated delay result) to taps 97 through 104 of the hybrid echo canceller 500. The second of the coefficients will be applied to taps 104 through 111. Similarly, the third coefficient will be applied to taps 112 through 119. It will be appreciated that the interpolation scheme may be applied to the remaining 144 taps of the long-tail echo component canceller 550.

Figure 6:
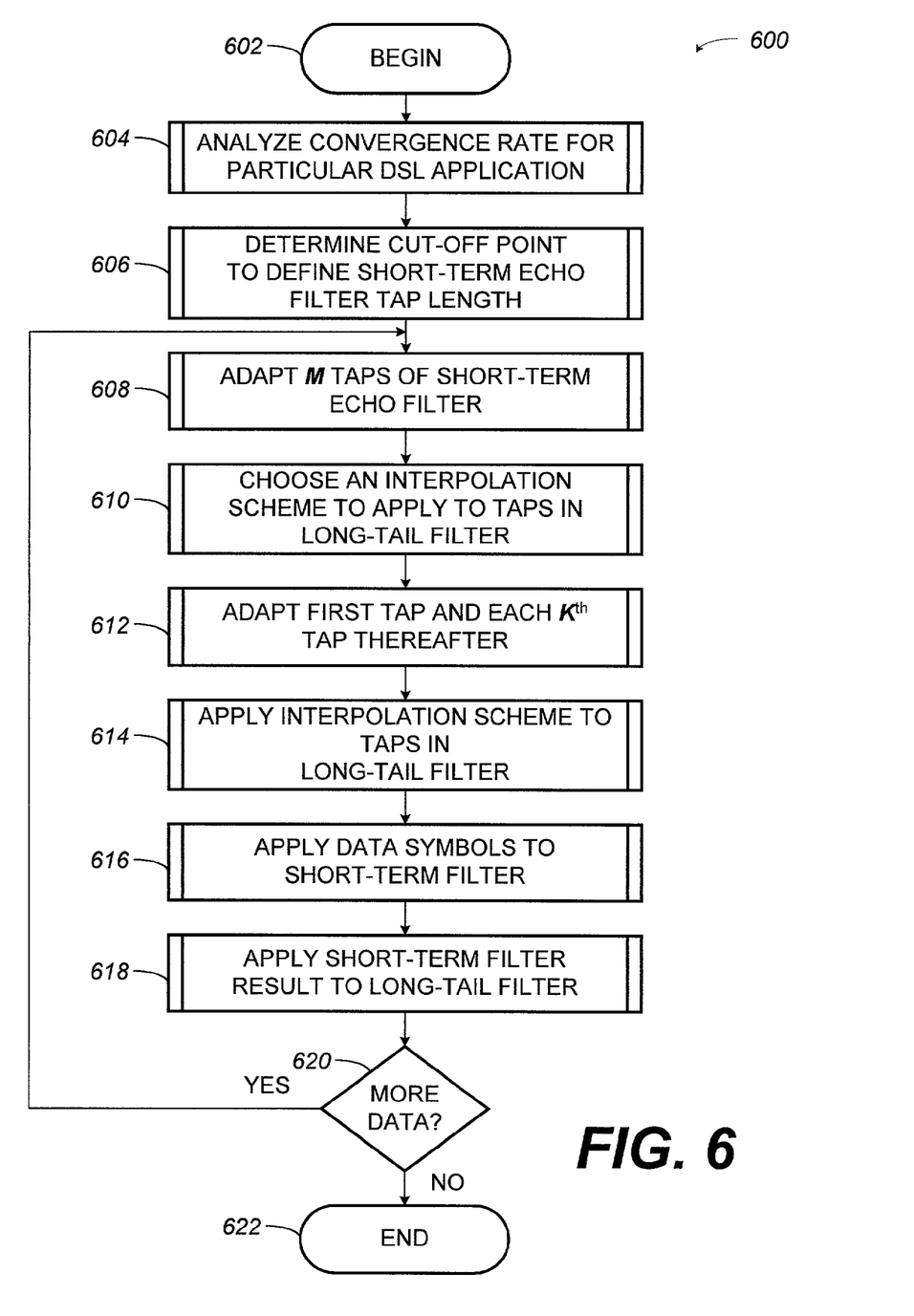
FIG. 6 is a flowchart illustrating a method for reducing transmit echo that may be practiced by the hybrid echo canceller of FIG. 5.

An exemplar hybrid canceller 500 having been introduced and described with regard to the schematic diagram of FIG. 5, reference is now directed to FIG. 6, which presents a flowchart illustrating a method for reducing transmit echo in a transceiver. In this regard, a method for reducing transmit echo 600 may commence with step 602, herein designated, "BEGIN." Next, in step 604, an appropriately configured transceiver may be configured to analyze the convergence rate for a FIR filter applied to a particular communication protocol of interest. As indicated in step 606, the transceiver may be configured to determine the length in taps required to cancel short-term echo in a transceiver. As shown in step 608, the transceiver, having determined an appropriate tap length to cancel short-term echo, may then adapt (i.e., calculate and apply appropriate coefficients for) each of the M taps of a short-term echo component filter 510 (FIG. 5).

It will be appreciated by those skilled in the art that the echo path transfer function and impulse response for a particular transceiver applying a particular DSL communication protocol having varying transmit and receive path filters will vary from transceiver to transceiver. The resulting variance in channel loss and echo path loss as well as the required signal to noise ratio will affect the required tap length, the adaptation step size, the optimum convergence step size and echo cancellation precision requirements of the filter. An adaptive filter such as the hybrid echo canceller 500 can be configured to estimate and update tap coefficients (e.g., $h_m$ or $t_n$) for the short-term echo component filter 520 and the long-tail echo component filter 550, respectively according to a least means square algorithm. It will be further appreciated that in order to have a fast initial convergence, the hybrid echo canceller 500 can be trained in a half-duplex mode during system startup. Moreover, the optimum convergence step size derived during startup training should be significantly reduced during full-duplex operation of the transceiver to maintain a low residual echo while tracking echo path transfer function variations over time.

As indicated in step 610, the transceiver may select an interpolation scheme to apply to the remaining taps of a long-tail echo component canceller 550 (FIG. 5). Next, in step 612, the transceiver may derive an appropriate coefficient for the first tap of the long-tail echo component canceller 550 and each K<sup>th</sup> tap thereafter. As illustrated in step 614, the transceiver may apply the interpolation scheme selected in step 610 to the remaining taps of the long-tail echo component canceller 550.

Once the short-term echo component canceller 510 and the long-tail echo component canceller 550 have been appropriately configured, the transceiver may be configured to apply a digital data stream to the input of the short-term echo component canceller 510 as indicated in step 616. After the data stream has been processed by the short-term echo component canceller 510 the result may be forwarded to the long-tail echo component canceller 550 as illustrated in step 618. Next, the transceiver may be programmed to check if data is available as indicated by the query of step 620. If the response to the query of step 620 is affirmative, (i.e., more data is to be processed by the transceiver) the transceiver may be programmed to repeat steps 608 through 618 until such time that data is no longer detected at the transceiver. Otherwise, if the result of the query of step 620 is negative the method for reducing transmit echo may be terminated as indicated in step 622, labeled, "END."

Any process descriptions or blocks in the flowchart of FIG. 6 should be understood to represent modules, segments, or portions of code which include one or more executable instructions for implementing specific logical functions or steps in the process for reducing transmit echo in a DSL transceiver or other communication device. Alternate implementations are included within the scope of the preferred embodiment of the present invention in which functions may be executed out of order from that shown or discussed, including substantially, concurrently, or in reverse order, depending on the functionality involved, as would be understood by those reasonably skilled in the art of the present invention.

It will be appreciated that the method for reducing transmit echo 600 as practiced by the hybrid echo canceller 500 (FIG. 5) may comprise an ordered listing of executable instructions for implementing logical functions and can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

In the context of this document, a "computer-readable medium" can be any means that can contain, store, communicate, propagate, or transport the program for use by the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable media includes the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be read via an optical scanning of the paper or other medium, then compiled, interpreted, or otherwise processed in a suitable manner before being stored in memory.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of the hybrid echo canceller and protected by the following claims.

The invention claimed is:

1. A transceiver, comprising:
means for receiving a locally generated transmit signal;
means for coupling the locally generated transmit signal to a communication medium, the means for coupling further coupled to a remotely generated receive signal; and
a multi-stage digital filter comprising a dual-stage finite impulse response (FIR) filter, the multi-stage digital filter configured to reduce both short-term echo components and long-tail echo components of the locally generated transmit signal, one stage of the dual-stage FIR filter separately processing the short-term echo components and another stage of the dual stage FIR filter separately processing the long-tail components, wherein the reduction of transmit signal echo is realized in a hybrid echo canceller.

2. The transceiver of claim 1, further comprising:
means for determining the length in taps of the digital filter required to reduce the short-term echo components; and
means for bifurcating the multi-stage digital filter responsive to the determination means.

3. The transceiver of claim 1, wherein the multi-stage digital filter comprises a first stage that applies coefficients derived for each tap of the first stage and a second stage that derives coefficient values for a subset of the taps of the second stage.

4. The transceiver of claim 3, wherein the second stage applies a coefficient value to each tap.

5. The transceiver of claim 3, wherein the second stage derives coefficient values for each K<sup>th</sup> tap.

6. The transceiver of claim 5, wherein the second stage uses an interpolation scheme to determine coefficients to apply at each of the taps disposed between taps associated with a derived coefficient.

7. The transceiver of claim 6, wherein the second stage applies a coefficient value at taps disposed between derived coefficients as a function of a coefficient value for the last derived coefficient.

8. The transceiver of claim 7, wherein the second stage applies the same coefficient value at taps disposed between derived coefficients as the coefficient value for the last derived coefficient.

9. A digital signal transceiver, comprising:
a transmitter configured to receive a locally generated transmit signal;
a hybrid electrically coupled to the transmitter configured to receive and inductively couple the transmit signal to a two-wire transmission line, the hybrid further configured to receive a remotely generated receive signal along the two-wire transmission line;
a receiver configured to process the remotely generated receive signal; and
an echo canceller disposed in parallel between the transmitter and the receiver, the echo canceller configured to reduce both short-term echo components and long-tail echo components of the locally generated transmit signal, wherein the echo canceller includes a Finite Impulse Response (FIR) filter to facilitate reduction of the long-tail echo components of the locally generated transmit signal, and wherein the echo canceller calculates coefficient values for less than N taps while emulating a N tap digital filter.

10. The transceiver of claim 9, wherein the echo canceller comprises a bifurcated digital filter that adaptively calculates and applies tap coefficients to each of a plurality of filter taps in a first stage and adaptively calculates and applies a subset of tap coefficient values to a plurality of filter taps in a second stage.

11. The transceiver of claim 10, wherein the digital filter adaptively calculates a tap coefficient value for a first tap of the second stage and every $K^{th}$ tap thereafter.

12. The transceiver of claim 11, wherein the digital filter interpolates the calculated tap coefficient values for the second stage to identify coefficient values to apply at taps disposed between taps associated with a calculated tap coefficient.

* * * * *